(12) United States Patent
Hanlon et al.

(10) Patent No.: US 8,919,504 B2
(45) Date of Patent: Dec. 30, 2014

(54) BRAKE ACTUATOR ASSEMBLY WITH LINE REPLACEABLE MOTOR FEATURES

(75) Inventors: Casey Hanlon, Queen Creek, AZ (US); Kellan Geck, Chandler, AZ (US); James Neil Quitmeyer, Chandler, AZ (US); Allan Blunt, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 884 days.

(21) Appl. No.: 12/732,771

(22) Filed: Mar. 26, 2010

(65) Prior Publication Data

US 2011/0132704 A1    Jun. 9, 2011

Related U.S. Application Data

(60) Provisional application No. 61/266,353, filed on Dec. 3, 2009.

(51) Int. Cl.
| | |
|---|---|
| *B60L 7/00* | (2006.01) |
| *B60T 7/04* | (2006.01) |
| *B60T 7/08* | (2006.01) |
| *B60T 13/74* | (2006.01) |
| *F16D 65/18* | (2006.01) |
| *F16D 65/28* | (2006.01) |
| *F16D 65/00* | (2006.01) |
| *F16D 121/24* | (2012.01) |
| *F16D 125/40* | (2012.01) |
| *F16D 125/48* | (2012.01) |
| *F16D 127/06* | (2012.01) |

(52) U.S. Cl.
CPC .............. B60T 7/042 (2013.01); *F16D 2121/24* (2013.01); *F16D 2125/40* (2013.01); *F16D 2125/48* (2013.01); *F16D 2127/06* (2013.01); *B60T 7/085* (2013.01); *B60T 13/741* (2013.01); *F16D 65/18* (2013.01); *F16D 65/28* (2013.01); *F16D 65/0043* (2013.01)
USPC .............. 188/162; 188/72.8; 310/77; 310/83; 277/549; 244/111

(58) Field of Classification Search
USPC ............ 277/549, 551, 543, 555, 556; 310/77, 310/93, 88, 83; 188/72.8, 72.7, 162; 244/111, 110 H
See application file for complete search history.

(56) References Cited

U.S. PATENT DOCUMENTS 571,708 A * 11/1896 Thompson .................... 137/845
2,510,114 A * 6/1950 Hummel ...................... 15/220.4

(Continued)

FOREIGN PATENT DOCUMENTS

| EP | 0 936 373 A2 | 8/1999 |
| EP | 0 936 373 A3 | 1/2001 |

(Continued)

OTHER PUBLICATIONS

Office Action dated Feb. 17, 2012 for co-pending U.S. Appl. No. 12/704,971 (10 pgs.).

(Continued)

*Primary Examiner* — Thomas Irvin
(74) *Attorney, Agent, or Firm* — Shumaker & Sieffert, P.A.

(57) ABSTRACT

An aircraft brake system electromechanical actuator is provided. The actuator is configured with features that allow the electric motor to be a line replaceable unit. One such feature is a foreign-object-damage shield that inhibits dust, debris, and/or other particulate contaminants from entering the electromechanical actuator during electric motor removal and replacement.

20 Claims, 7 Drawing Sheets

(56) References Cited

U.S. PATENT DOCUMENTS

| | | | |
|---|---|---|---|
| 2,528,332 A * | 10/1950 | Bergquist | 229/125.02 |
| 2,725,123 A | 11/1955 | Reuland | |
| 3,401,867 A * | 9/1968 | Long et al. | 55/361 |
| 3,834,718 A * | 9/1974 | Gyongyosi et al. | 277/322 |
| 4,042,248 A * | 8/1977 | Williamitis | 277/555 |
| 4,430,592 A | 2/1984 | Manktelow | |
| 4,865,162 A * | 9/1989 | Morris et al. | 188/72.8 |
| 5,005,767 A * | 4/1991 | Heren | 239/288 |
| 5,111,854 A * | 5/1992 | Begley et al. | 141/65 |
| 5,400,885 A * | 3/1995 | Phillips | 192/223.1 |
| 5,497,860 A | 3/1996 | Hendricks | |
| 6,095,293 A | 8/2000 | Brundrett et al. | |
| 6,471,017 B1 | 10/2002 | Booz et al. | |
| 6,559,566 B2 * | 5/2003 | Modi et al. | 310/89 |
| 6,581,730 B1 * | 6/2003 | Haydon et al. | 188/71.5 |
| 6,688,603 B2 * | 2/2004 | vom Schemm | 277/553 |
| 6,907,966 B2 | 6/2005 | Audren et al. | |
| 7,960,881 B2 * | 6/2011 | Burton | 310/88 |
| 8,037,971 B2 * | 10/2011 | Chico et al. | 188/18 A |
| 2003/0197424 A1 | 10/2003 | Frey et al. | |
| 2004/0214680 A1* | 10/2004 | Schoon | 475/149 |
| 2005/0115778 A1 | 6/2005 | Chico et al. | |
| 2005/0247529 A1 | 11/2005 | Gaines et al. | |
| 2005/0269872 A1* | 12/2005 | Ralea | 303/20 |
| 2006/0032712 A1 | 2/2006 | Kollaard et al. | |
| 2006/0102436 A1 | 5/2006 | Haydon et al. | |
| 2008/0084109 A1 | 4/2008 | Griffith et al. | |
| 2008/0110435 A1 | 5/2008 | Baasch et al. | |
| 2008/0135349 A1* | 6/2008 | Himes et al. | 188/71.5 |
| 2008/0169160 A1 | 7/2008 | Solignat et al. | |
| 2010/0090551 A1* | 4/2010 | Burton | 310/88 |
| 2011/0132704 A1 | 6/2011 | Hanlon et al. | |
| 2011/0198163 A1 | 8/2011 | Hanlon et al. | |

FOREIGN PATENT DOCUMENTS

| | | |
|---|---|---|
| EP | 1084949 A2 | 3/2001 |
| EP | 1 533 536 A1 | 5/2005 |
| EP | 2 060 821 A1 | 5/2009 |
| GB | 775052 | 5/1957 |
| WO | 2005001303 A2 | 1/2005 |
| WO | 2005001303 A3 | 1/2005 |
| WO | 2006025905 A1 | 3/2006 |
| WO | 2008144718 A1 | 11/2008 |

OTHER PUBLICATIONS

Responsive Amendment dated May 17, 2012 for co-pending U.S. Appl. No. 12/704,971 (11 pgs.).
Advisory Action dated Oct. 22, 2012 for co-pending U.S. Appl. No. 12/704,971 (3 pgs.).
Notice of Appeal and Pre-Appeal Brief Request for Review from U.S. Appl. No. 12/704,971, filed Nov. 19, 2012, 6 pages.
Response to final Office Action for U.S. Appl. No. 12/704,971, filed Sep. 13, 2012, 8 pages.
Office Action from U.S. Appl. No. 12/704,971, dated Jul. 20, 2012, 18 pages.
Response to Office Action dated Apr. 25, 2013, from U.S. Appl. No. 12/704,971, filed Jul. 10, 2013, 11 pp.
Office Action dated Apr. 25, 2013 from co-pending U.S. Appl. No. 12/704,971, 16 pages.
Appeal Brief from co-pending U.S. Appl. No. 14/704,971, dated Jan. 28, 2013, 28 pages.
Pre-Appeal Brief Decision from co-pending U.S. Appl. No. 12/704,971, dated Dec. 27, 2012, 2 pages.
Final Office Action from co-pending U.S. Appl. No. 12/704,971 dated Oct. 29, 2013. 18 pp.
Search Report from counterpart European patent application No. 10192109.6 dated Nov. 27, 2013. 3 pp.
Examination Report from counterpart European patent application No. 10192109.6 dated Dec. 13, 2013. 4 pp.
Pre-Appeal Brief Request for Review from U.S. Appl. No. 12/704,971, filed Jan. 29, 2014, 6 pp.
Notice of Panel Decision from Pre-Appeal Brief Review from U.S. Appl. No. 12/704,971, dated Mar. 11, 2014, 2 pp.
Examiner's Answer from co-pending U.S. Appl. No. 12/704/971, dated Jun. 24, 2014, 15 pp.
Response to the Examination Report in counterpart European Patent Application No. EP 10192109.6, filed on Apr. 1, 2014, 11 pp.
Reply Brief in response to Examiner's Answer dated Jun. 24, 2014, from U.S. Appl. No. 12/704,971, dated Aug. 22, 2014, 11 pp.

* cited by examiner imagery # BRAKE ACTUATOR ASSEMBLY WITH LINE REPLACEABLE MOTOR FEATURES

CROSS-REFERENCE TO RELATED APPLICATION

This application claims the benefit of U.S. Provisional Application No. 61/266,353, filed Dec. 3, 2009.

TECHNICAL FIELD

The present invention relates to aircraft brake actuation systems and, more particularly, to a brake actuation system electromechanical actuator assembly that includes features that enhance in-place motor replacement.

BACKGROUND

When a jet-powered aircraft lands, the aircraft brakes, various aerodynamic drag sources (e.g., flaps, spoilers, etc.), and, in many instances, aircraft thrust reversers, are used to slow the aircraft down in the desired amount of runway distance. Once the aircraft is sufficiently slowed, and is taxiing from the runway toward its ground destination, the aircraft brakes are used to slow the aircraft, and bring it to a stop at its final ground destination.

Presently, many aircraft brake systems include a plurality of hydraulic, pneumatic, or electromechanical actuators, and a plurality of wheel mounted brakes. The brakes in many aircraft are implemented as multi-disk brakes, which include a plurality of stator disks and rotor disks. The stator disks and rotor disks may be alternately splined to a torque tube or wheel rim, and disposed parallel to one another, to form a brake disk packet. The actuators, in response to an appropriate pilot-initiated command, move between an engage position and a disengage position. In the engage position, the actuators each engage a brake disk packet, moving the brake disks into engagement with one another, to thereby generate the desired braking force.

As was noted above, the actuators used in some aircraft brake systems may be electromechanical actuators. An electromechanical actuator typically includes an electric motor and an actuator. The electric motor may supply a rotational drive force to the actuator, which converts the rotational drive force to translational motion, and thereby translate, for example, between a brake engage position and a brake disengage position.

Presently, aircraft brake system electromechanical actuators are configured as line replaceable units (LRUs). This means that each of the electromechanical actuators may, if needed, be removed from the aircraft and replaced with a new electromechanical actuator. At times, only the electric motor of an electromechanical actuator may need to be replaced. However, present aircraft brake system electromechanical actuators are not configured such that the electric motor is an LRU. In other words, present aircraft brake system electromechanical actuators are not configured to allow removal and replacement of the electric motor while the remainder of the electromechanical actuator remains installed on the aircraft. Moreover, even if such a configuration is provided, there is a potential for dust, debris, and/or other particulate contaminants to enter the electromechanical actuator.

Hence, there is a need for an aircraft brake system electromechanical actuator that is configured such that the electric motor is an LRU, and such that dust, debris, and/or other particulate contaminants are inhibited from entering the electromechanical actuator during electric motor removal and replacement. The present invention addresses one or more of these needs.

BRIEF SUMMARY

In one embodiment, an aircraft electric brake actuator assembly includes an actuator housing, a motor housing, an actuator, and an electric motor. The actuator housing is configured to be mounted on an aircraft landing gear. The motor housing is coupled to the actuator housing and is removable therefrom. The motor housing is also accessible when the actuator housing is mounted on an aircraft landing gear. The actuator is disposed within the actuator housing, is coupled to receive a drive torque, and is configured, upon receipt of the drive torque, to translate to a position. The electric motor is disposed within the motor housing and is removably coupled to the actuator. The electric motor is adapted to be selectively energized and is configured, upon being energized, to rotate and thereby supply the drive torque to the actuator.

In another embodiment, an aircraft electric brake actuator assembly includes an actuator housing, an actuator, a gear set, an electric motor, and a foreign-object-damage (FOD) shield. The actuator housing is configured to be mounted on an aircraft landing gear, and defines an actuator gearbox housing. The actuator is disposed within the actuator housing, is coupled to receive a drive torque, and is configured, upon receipt of the drive torque, to translate to a position. The gear set is disposed within the actuator gearbox housing and is coupled to the actuator. The electric motor is coupled to the actuator housing and includes an output shaft coupled to the gear set. The electric motor is configured to at least selectively supply a drive torque to the actuator via the gear set. The FOD shield is disposed between the electric motor and the actuator gearbox housing, and includes an opening through which the output shaft extends. The opening in the FOD shield is dimensioned to at least inhibit debris ingress into the gearbox housing when the electric motor is removed.

In still another embodiment, an aircraft electric brake actuator assembly includes an actuator housing, a motor housing, an actuator, a gear set, an electric motor, and a foreign-object-damage (FOD) shield. The actuator housing is configured to be mounted on an aircraft landing gear, and defines an actuator gearbox housing. The motor housing is coupled to the actuator housing and is removable therefrom. The motor housing is accessible when the actuator housing is mounted on an aircraft landing gear. The actuator is disposed within the actuator housing, is coupled to receive a drive torque, and is configured, upon receipt of the drive torque, to translate to a position. The gear set is disposed within the actuator gearbox housing and is coupled to the actuator. The electric motor is disposed within the motor housing and is coupled to the actuator housing. The electric motor includes an output shaft coupled to the gear set. The electric motor is configured to at least selectively supply a drive torque to the actuator via the gear set. The FOD shield is disposed between the electric motor and the actuator gearbox housing, and includes an opening through which the output shaft extends. The opening in the FOD shield is dimensioned to at least inhibit debris ingress into the gearbox housing when the electric motor is removed.

Furthermore, other independent features and advantages of the preferred aircraft electric brake actuator will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it is to be appreciated that the described embodiment is not limited to use in conjunction with a specific vehicle or brake system. Thus, although the description is explicitly directed toward an embodiment that is implemented in an aircraft brake actuation system, it should be appreciated that it can be implemented in other vehicles and other brake actuation system designs, including those known now or hereafter in the art.

Figure 1:
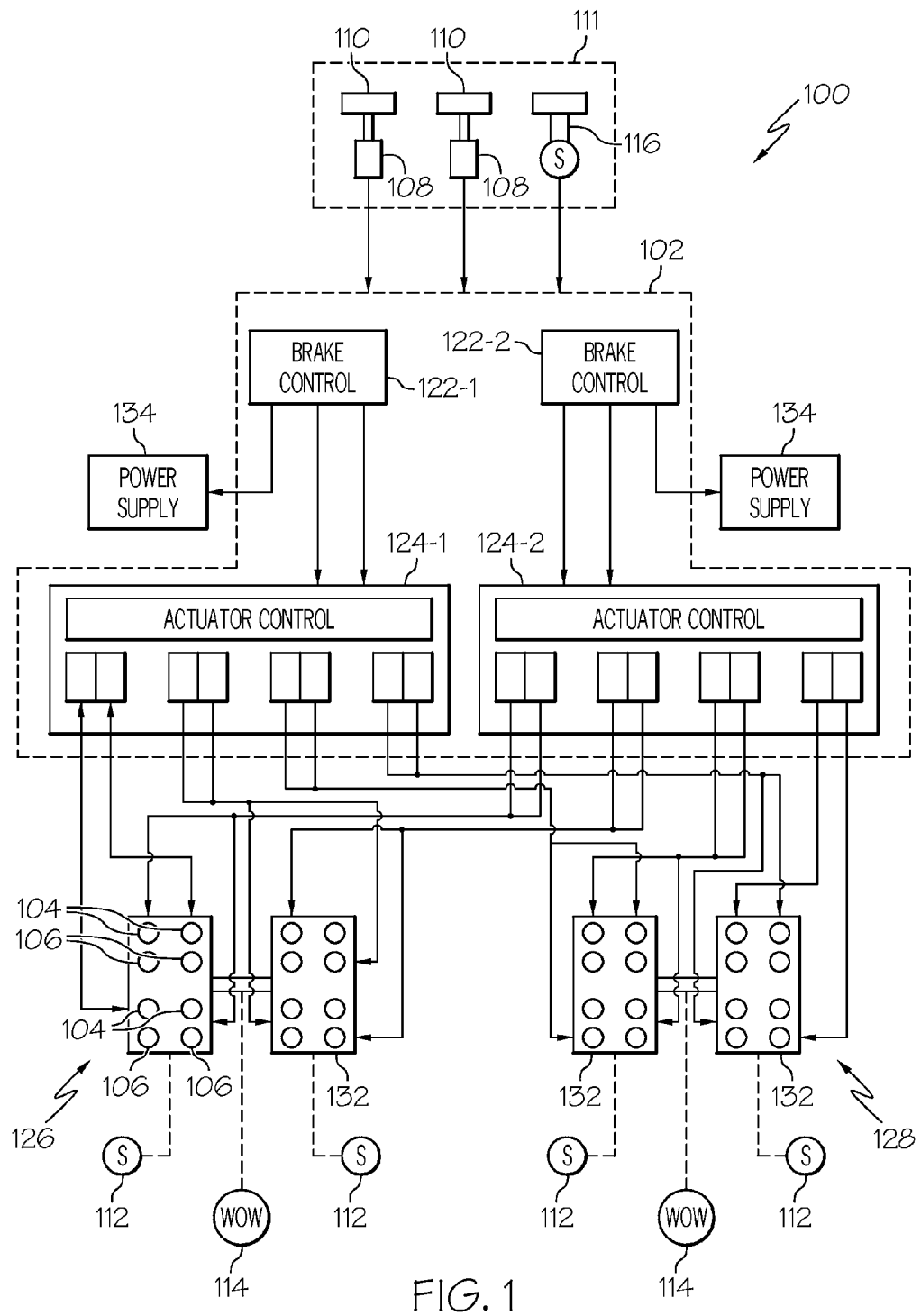
FIG. 1 depicts a functional block diagram of an exemplary embodiment of aircraft brake actuation system.

Turning now to the description, and with reference first to FIG. 1, a functional block diagram of an exemplary aircraft brake actuation system 100 is shown. In the depicted embodiment, the system 100 includes a control circuit 102, a plurality of electric brake actuator assemblies 104, and a plurality of actuator brakes 106. The control circuit 102 receives brake command signals that are representative of a desired brake force. The brake command signals are supplied from, for example, brake pedal transducers 108 that are coupled to brake pedals 110 located in an aircraft cockpit 111. The brake pedal transducers 108 are preferably implemented using position sensors, which provide position signals representative of the position of the brake pedals 110. The control circuit 102, using the position signals and the known spring rate of a return spring (not illustrated) coupled to the brake pedals 110, calculates the application force a pilot is supplying to the brake pedals 110. It will be appreciated that the brake pedal transducers 108 may be implemented using any one of numerous types of position sensors now known or developed in the future. In a particular embodiment, LVDT (linear variable differential transformer) position sensors are used. Moreover, other types of sensors, such as force sensors, could also be used if desired.

The control circuit 102 also receives one or more signals representative of aircraft operational state. The number and type of sensors used to supply the one or more signals representative of operational state may vary. In the depicted embodiment the sensors include one or more wheel speed sensors 112, one or more weight-on-wheels sensors 114, and one or more throttle position sensors 116. The one or more wheel speed sensors 112 are each configured to sense the rotational speed of an aircraft wheel 132 and supply a wheel speed signal representative thereof. The one or more weight-on-wheels sensors 114 are each configured to sense when the aircraft is on the ground (or other surface) and supply a signal representative thereof. The one or more engine throttle position sensors 116 are each configured to sense the position of the aircraft engine throttle and supply an engine throttle position signal representative thereof. It will be appreciated that the wheel speed sensors 112, the weight-on-wheels sensors 114, and the engine throttle position sensors 116 may be implemented using any one of numerous types of sensors now known or developed in the future.

The control circuit 102 is configured to process the brake command signals supplied from the brake pedal transducers 108, and controllably energize the electric brake actuator assemblies 104 to move to a brake position that corresponds to the commanded brake force. The control circuit 102 is also configured to process the brake command signals to determine when the brake pedal application force supplied from the pilot exceeds a set force magnitude and, upon exceeding the set force magnitude, when the brake pedal application force is less than a reset force magnitude. The control circuit 102 is additionally configured to process the one or more signals representative of aircraft operational state to determine when the aircraft is in a ground-idle state. The control circuit 102, based on these determinations, selectively supplies actuator brake commands to the actuator brakes 106 and selectively de-energizes and re-energizes the electric brake actuator assemblies 104. This latter functionality will be described in more detail further below.

Before proceeding further, it is noted that the term "ground-idle state," as used herein, means that the aircraft is on the ground (or other surface), the aircraft is stationary (or at least moving at less than a predetermined speed), and the aircraft engines are in an idle running state. The engines may be in an idle running state when, for example, the engine throttles are positioned to a ground-idle position. It will be appreciated, however, that various other engine throttle positions could be used to indicate that the aircraft engines are in an idle running state.

Returning now to the system description, it will be appreciated that the control circuit 102 may be variously configured to implement the functionality described above. In the depicted embodiment, however, the control circuit 102 includes a plurality of brake controls 122 and a plurality of actuator controls 124. Each brake control 122 is coupled to receive the one or more operational state signals and the brake command signals and is configured, in response to these signals, to supply actuator commands, the friction brake commands, and power enable/disable commands. In a particular preferred embodiment, the brake controls 122 translate the calculated brake pedal application forces to command force levels for the electric brake actuator assemblies 104. In the depicted embodiment, the control circuit 102 includes two brake controls 122-1, 122-2 to provide suitable redundancy. It will be appreciated, however, that the control circuit 102 could be implemented with more or less than this number of brake controls 122.

The actuator controls 124 are each coupled to receive the actuator commands and are each configured, in response to the actuator commands, to controllably energize a plurality of the electric brake actuator assemblies 104 to move to a brake position that corresponds to the commanded brake force. In the depicted embodiment, the control circuit 102 includes two multi-channel actuator controls 124-1, 124-2 to provide suitable redundancy. The number of channels in each actuator control 124 may vary depending, for example, on the number of electric brake actuator assemblies 104. This is because each channel in an actuator control 124 is preferably associated a single electric brake actuator 104. In the depicted embodiment, the system 100 is configured to be used with an aircraft that includes a left landing gear 126 and a right landing gear 128, with each landing gear having two wheels 132—an inboard wheel and an outboard wheel. The system 100 is additionally configured so that four electric brake actuator assemblies 104 are associated with each wheel 132, and all four of the electric brake actuator assemblies 104 associated with the same wheel 132 apply a brake force to the same brake stack. There is one actuator brake 106 associated with each actuator 104. Thus, the system 100, at least in the depicted embodiment, includes a total of sixteen electric brake actuator assemblies 104 and sixteen actuator brakes 106, and each actuator control 124 includes eight channels for a total of sixteen channels. It will be appreciated that this is merely exemplary of a particular embodiment, and that the system 100 could be configured to include more or less than this number of electric brake actuator assemblies 104 and actuator brakes 106 and, concomitantly, channels per actuator control 124.

In addition to the redundancy provided via the plurality of actuator controls 124, the system 100 provides further redundancy by, as depicted in FIG. 1, coupling half of the electric brake actuator assemblies 104 associated with each wheel 132 to two channels in different actuator controls 124. For example, it is seen that two of the electric brake actuator assemblies 104 associated with the outboard wheel 132 of the left landing gear 126 are coupled to two independent channels in one actuator control 124-1, and the other two electric brake actuator assemblies 104 are coupled to two independent channels in the other actuator control 124-2. In this manner, even in the unlikely event one of the actuator controls 124 becomes inoperable, there will remain at least two operable electric brake actuator assemblies 104 associated with each wheel 132.

It will be appreciated that the control circuit 102 may be implemented using one or more general purpose processors, content addressable memory, digital signal processors, application specific integrated circuits, field programmable gate arrays, any suitable programmable logic devices, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

No matter how the control circuit 102 is specifically implemented, each electric brake actuator 104 is configured, upon being controllably energized, to move to a brake position that corresponds to the commanded brake force, to thereby supply the desired brake force to its associated wheel 132. Moreover, the actuator brakes 106 are each configured, in response to the actuator brake commands supplied by the control circuit 102, to selectively move to an engage position or a disengage position to engage or disengage, respectively, one of the electric brake actuator assemblies 104. In the engage position, each actuator brake 106 holds its associated electric brake actuator assemblies 104 in the last commanded brake position.

As FIG. 1 additionally depicts, the system 100 may also include one or more power supplies (or power converters) 134. The power supplies 134 preferably provide electrical power to various portions of the control circuit 102, such as the actuator controls 124. The power supplies 134 are configured, in response to the power enable/disable signals supplied from the brake controls 122, to selectively remove electrical power from, and subsequently restore electrical power to, the actuator controls 124. The circumstances under which the control circuit 102 commands the power supplies 134 to remove electrical power from and subsequently restore electrical to the actuator controls 124 will be described in more detail further below.

Figure 2:
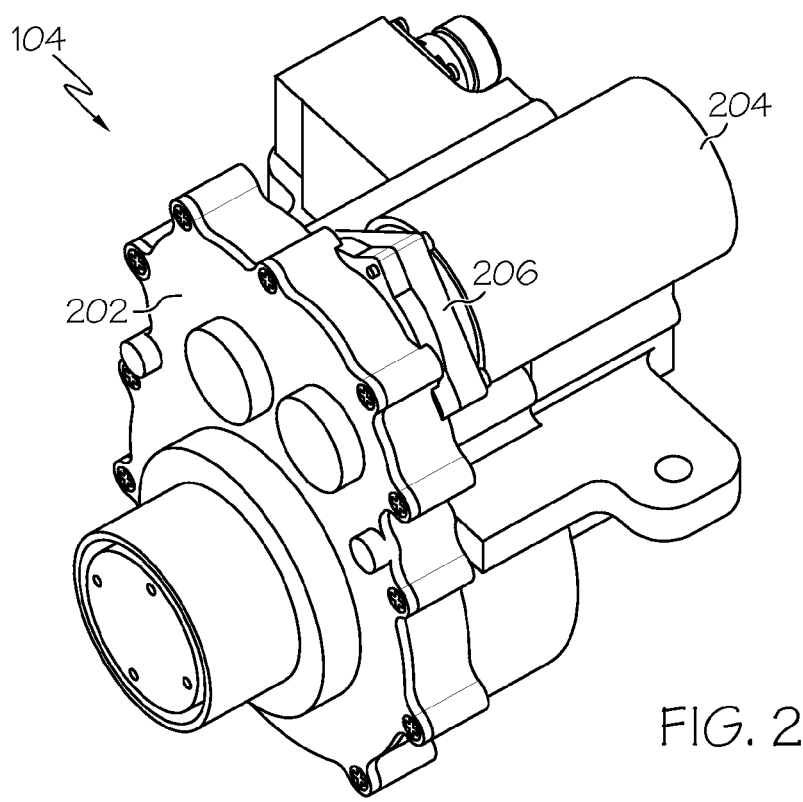
FIGS. 2 and 3 are front and rear perspective views, respectively, of an exemplary physical embodiment of an actuator assembly that may be used in the system of FIG. 1.
Figure 3:
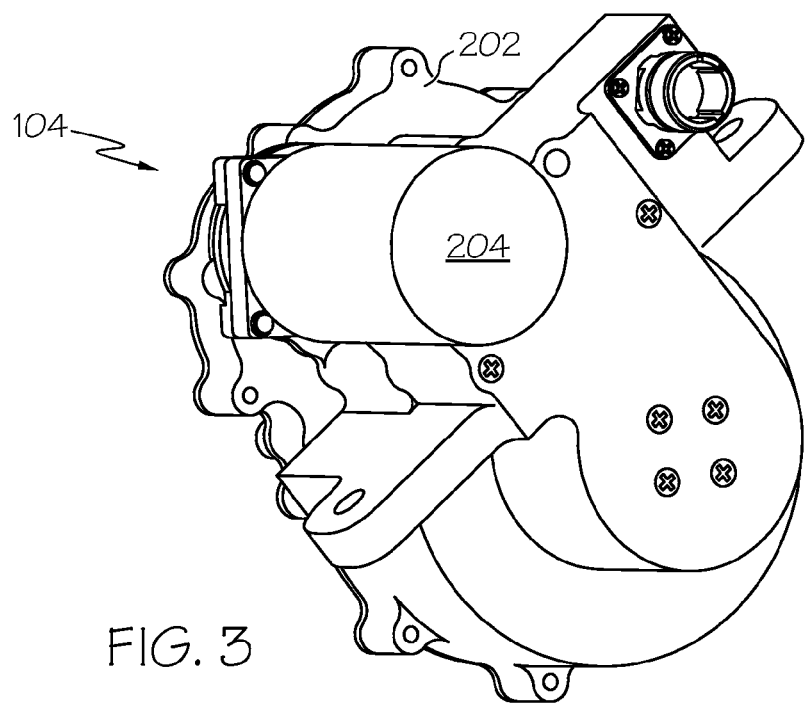
Figure 4:
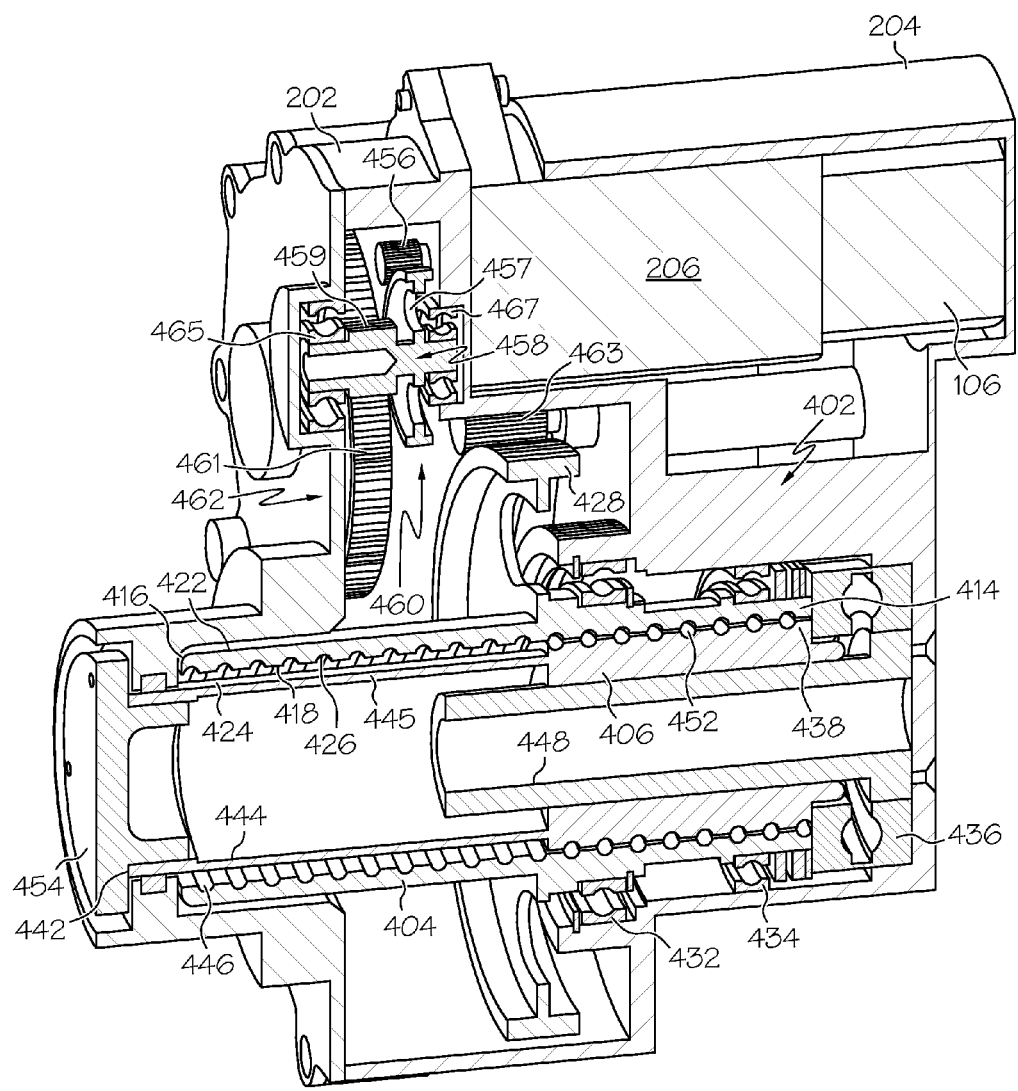
FIG. 4 is a cross section view of the actuator assembly depicted in FIGS. 2 and 3.
Figure 5:
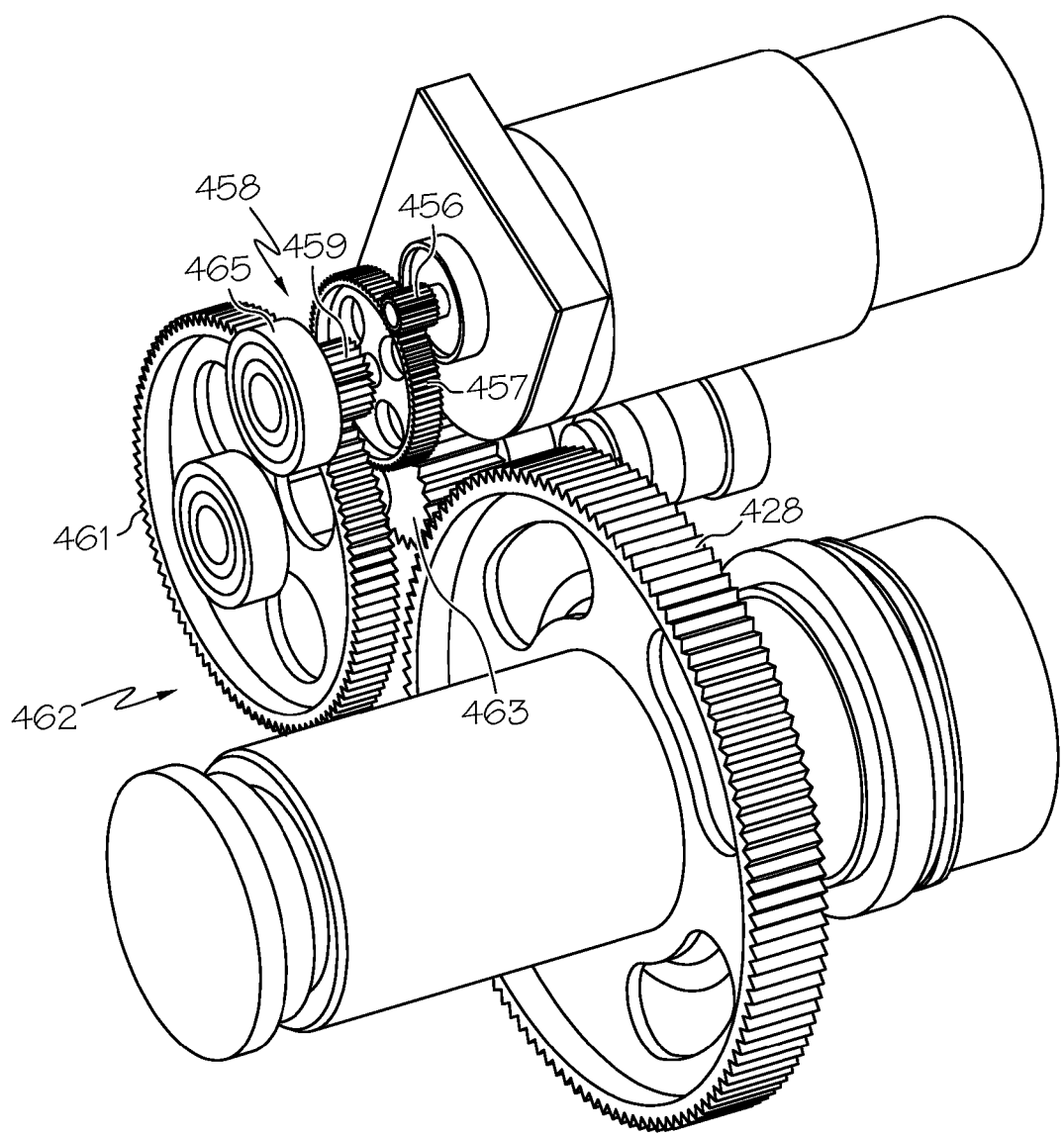
FIG. 5 is a perspective view of the exemplary actuator assembly depicted in FIGS. 2 and 3 with the housing portions removed.

An embodiment of an exemplary physical implementation of one of the actuator assemblies 104 that may be used in the system 100 is depicted in FIGS. 2-6, and with reference thereto, will now be described. Referring first to FIGS. 2-4, it is seen that the actuator assembly 104 includes an actuator housing 202 and a removable motor housing 204. A motor 206 and an actuator brake 106 are disposed within the removable motor housing 204, and an actuator 402 (see FIG. 4) is disposed within the actuator housing 202. The motor 206 is configured to be controllably energized by one of the actuator controls 124 and, upon being energized, to rotate and supply a drive torque. The motor 206 may be any one of numerous types of electric motors. In a particular preferred embodiment, the motor 206 is implemented as a brushless DC motor. No matter the particular type of motor 206 that is used, the drive torque is supplied to the actuator 402, an embodiment of which, for completeness, will now be described.

As shown most clearly in FIG. 4, the actuator 402 includes a ballscrew 404 and a ballnut 406. The ballscrew 404 is rotationally mounted within the actuator housing 202 and includes a first end 414, a second end 416, an inner surface 418, and an outer surface 422. The ballscrew inner surface 418 defines a substantially cylindrical passageway 424 through the ballscrew 404, and has a plurality of ball grooves (or "threads") 426 formed thereon. The ballscrew 404 is coupled to receive the drive torque from the motor 206 and, in response thereto, to rotate. In the depicted embodiment, an input gear 428 is coupled to the ballscrew outer surface 422, and receives the drive torque, via a plurality of gears that are described further below, which in turn causes the ballscrew 404 to rotate. Although the ballscrew input gear 428 is shown disposed substantially centrally between the ballscrew first 414 and second 416 ends, it will be appreciated that this is merely exemplary of a particular preferred embodiment, and that the input gear could be coupled to other locations on the ballscrew outer surface 422, or to either the ballscrew first end 414 or second end 416.

A plurality of bearing assemblies, which includes a first bearing assembly 432 and a second bearing assembly 434, are mounted within the actuator housing 202 and are used to rotationally support the ballscrew 404 therein. Moreover, a thrust bearing assembly 436 is preferably disposed between the actuator housing 202 and the ballscrew first end 414. The thrust bearing assembly 436 transfers any axial force supplied to the ballscrew 404 to the actuator housing 202.

The ballnut 406 is disposed at least partially within the ballscrew 404 and includes a first end 438 and a second end 442. An extension tube (or ram) 445 is coupled to the ballnut second end 442, and includes an inner surface 444, and an outer surface 446. The ballnut 406, and concomitantly the ram 445, are mounted against rotation within the actuator housing 202 and are configured, in response to rotation of the ballscrew 404, to translate axially within the ballscrew cylindrical passageway 424. It will be appreciated that the direction in which the ballnut 406 and ram 445 travel will depend on the direction in which the ballscrew 404 rotates. In the depicted embodiment, an anti-rotation shaft 448 is coupled to the actuator housing 202 and engages the ballnut 406 to prevent its rotation. It will be appreciated that the anti-rotation shaft 448 and ballnut 406 may be configured in any one of numerous ways to prevent ballnut rotation. In the depicted embodiment, the anti-rotation shaft 448 is disposed at least partially within a groove (not shown) formed in a portion of the ballnut inner surface 444, to thereby prevent its rotation.

The ballnut 406, similar to the ballscrew 404, has a plurality of ball grooves (or "threads") 452 formed therein. However, unlike the ballscrew ball grooves 426, the ballnut ball grooves 452 are formed in the ballnut outer surface 446. A plurality of non-illustrated balls are disposed within the ballnut ball grooves 452, and in selected ones of the ballscrew ball grooves 426. The balls, in combination with the ball grooves 426, 452, convert the rotational movement of the ballscrew 404 into the translational movement of the ballnut 406 and ram 445. A pad 454 is coupled to the ram second end 442. The pad 454 engages an aircraft brake element (not shown) when the actuator brake 106 is commanded to an engage position.

As was mentioned above, the drive torque of the motor 206 is supplied to the ballscrew 404 via a plurality of gears. With reference now to both FIGS. 4 and 5, it may be seen that in the depicted embodiment the gears, are disposed within an actuator gearbox housing 460 that is defined by the actuator housing 202, include a motor output gear 456, a first intermediate gear set 458, a second intermediate gear set 462, and the ballscrew input gear 428. The motor output gear 456 is coupled to the motor 206, and engages the first intermediate gear set 458. Thus, the motor output gear 456 receives the drive torque directly therefrom, and causes the first intermediate gear set 458 to rotate in response thereto. The first intermediate gear set 458 includes two gears, an input gear 457 and an output gear 459, and is rotationally mounted within the actuator gearbox housing 460 via third and fourth bearing assemblies 465 and 467, respectively. The first intermediate gear set input gear 457 engages the motor output gear 456, and the first intermediate gear set output gear 459 engages the second intermediate gear set 462.

The second intermediate gear set 462, similar to the first intermediate gear set 458, is rotationally mounted in the actuator gearbox housing 460 and includes two gears. More specifically, the second intermediate gear set 462 is rotationally mounted in the actuator gearbox housing 460 via non-depicted fifth and sixth bearing assemblies, and includes an input gear 461 and an output gear 463. The second intermediate gear set input gear 461 engages the first intermediate gear set output gear 459, and the second intermediate gear set output gear 463 engages the ballscrew input gear 428.

With the above-described gear configuration, the first intermediate gear set 458 receives, via the motor output gear 456, the drive torque supplied by the motor 206. As a result, the first intermediate gear set 458 rotates, and supplies the drive torque to the second intermediate gear set 462. In turn, the second intermediate gear set 462 rotates and supplies the drive torque to the ballscrew input gear 428, which causes the ballscrew 404 to rotate. It will be appreciated that the gear ratio between the motor output gear 456 and the first intermediate gear set input gear 457 provides a first rotational speed reduction, and the gear ratio between the first intermediate gear set output gear 459 and the second intermediate gear set 462 provides a second rotational speed reduction. It will be appreciated that the individual and/or collective gear ratios and the concomitant individual and/or collective rotational speed reductions may vary to achieve a desired torque-speed characteristic for the actuator assembly 104.

Figure 6:
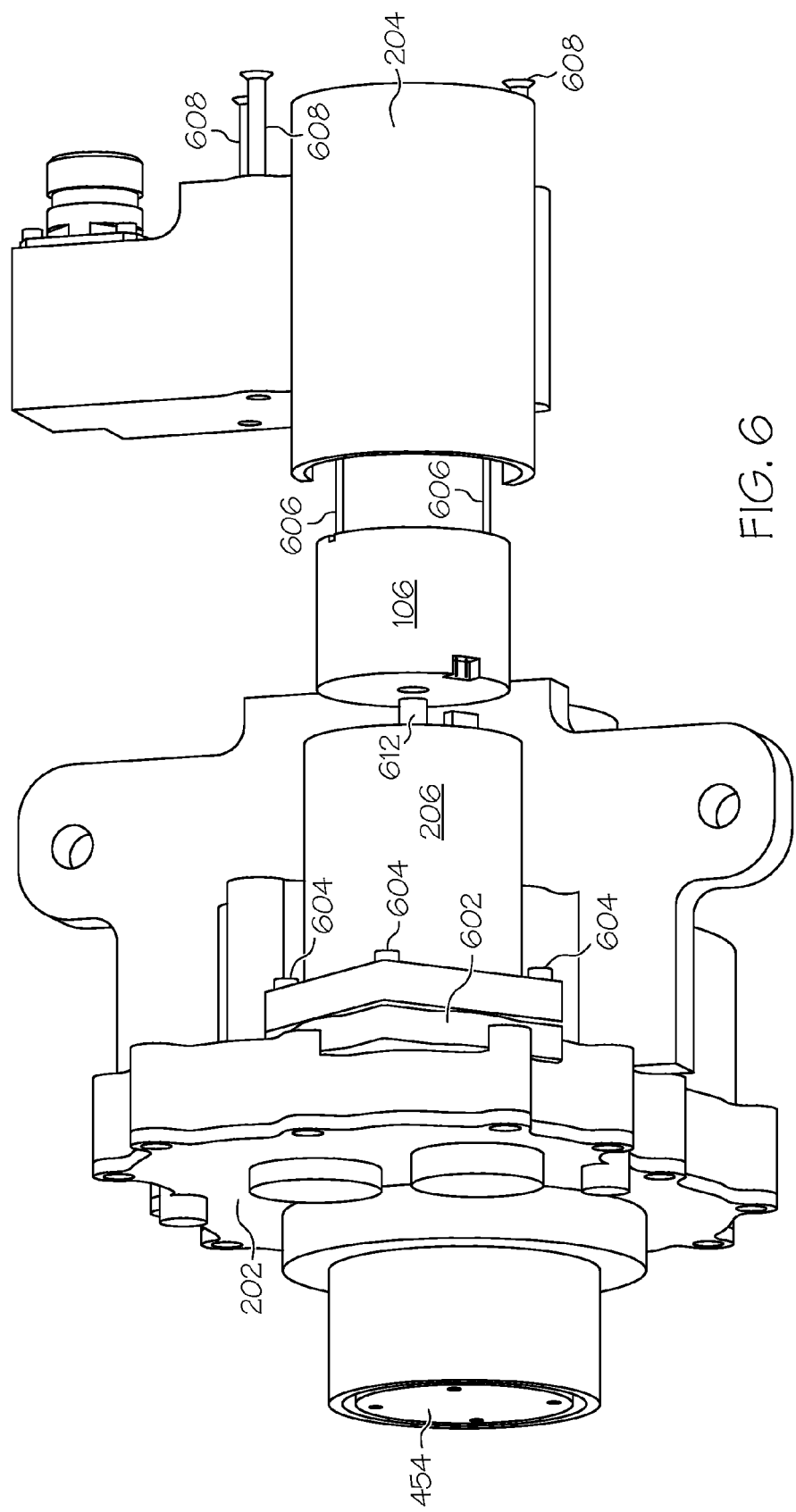
FIG. 6 depicts the actuator assembly of FIGS. 2 and 3 in a partially disassembled state.

Referring now to FIG. 6, it was also noted above that the motor 206 and actuator brake 106 are disposed within the removable motor housing 204. More specifically, it is seen that the motor 206 is removably coupled to a mounting flange 602 on the actuator housing 202 via a plurality of motor mounting bolts 604. Moreover, the actuator brake 106 is removably coupled to the motor 206 via a plurality of actuator brake mounting bolts 606. The removable motor housing 204 envelopes at least a portion of the motor 206 and the actuator brake 106, and is removably coupled to the actuator housing 202 via a plurality of motor housing bolts 608. The removable motor housing 204 is also accessible when the actuator housing 202 is mounted on an aircraft landing gear. This configuration enables the motor 206 and actuator brake 106 to be removed and replaced in the field without the need for any special tools.

Figure 7:
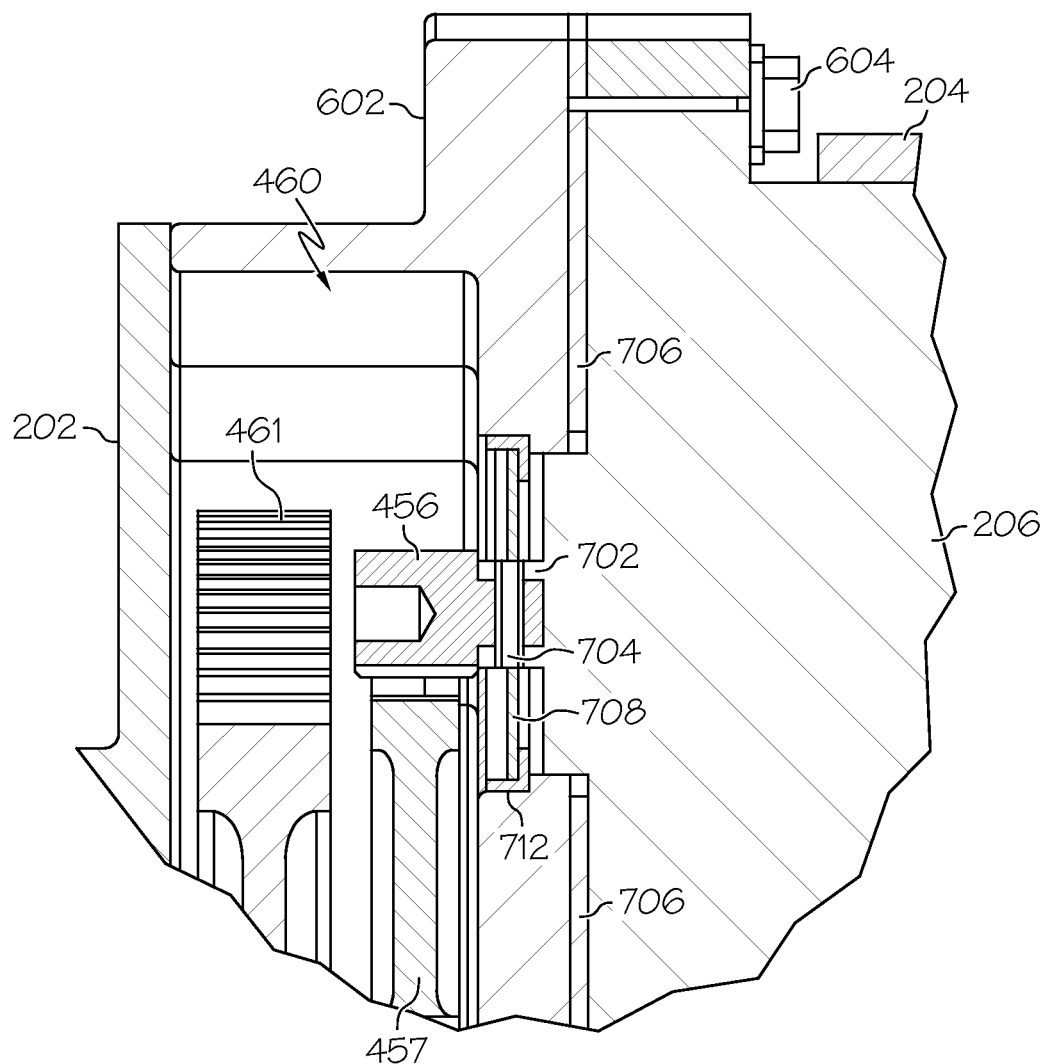
FIG. 7 depicts a close-up cross section view of a portion of the actuator assembly of FIGS. 2 and 3, showing the motor/actuator interface in more detail.

As shown more clearly in FIG. 7, the motor 206 includes an output shaft 702 that is coupled to the motor output gear 456. The motor output shaft 702 has a nominal outer diameter and may be coupled to the motor output gear 456 using any one of numerous techniques. In the depicted embodiment, however, it is coupled to the motor output gear 456 via a pin 704 that extends through the output shaft 702 and motor output gear. A seal 706 is preferably disposed between the motor 206 and the mounting flange 602. The seal 706 may be implemented using various materials, but in a preferred embodiment is implemented using a thermally insulative type of material such as, for example, Vespel® manufactured by the DuPont®.

As FIG. 7 also depicts, a foreign-object-damage (FOD) shield 708 is disposed between the motor 206 and actuator gearbox housing 460. The FOD shield 708 provides barrier to prevent (or at least inhibit) the introduction of dust, debris, and/or other particulate contaminants into the actuator gearbox housing 460. In the depicted embodiment, the FOD shield 708 is disposed within a support structure 712, which is mounted on, or otherwise coupled to, the actuator gearbox housing 460. It will be appreciated that the FOD shield 708 may be coupled to the support structure 712 via, for example, adhesive, or it may be formed as an integral part of the support structure 712. It will additionally be appreciated that the support structure 712 may be variously coupled to the actuator gearbox housing 460, but in a particular preferred embodiment non-illustrated flush mounting fasteners are used.

Figure 8:
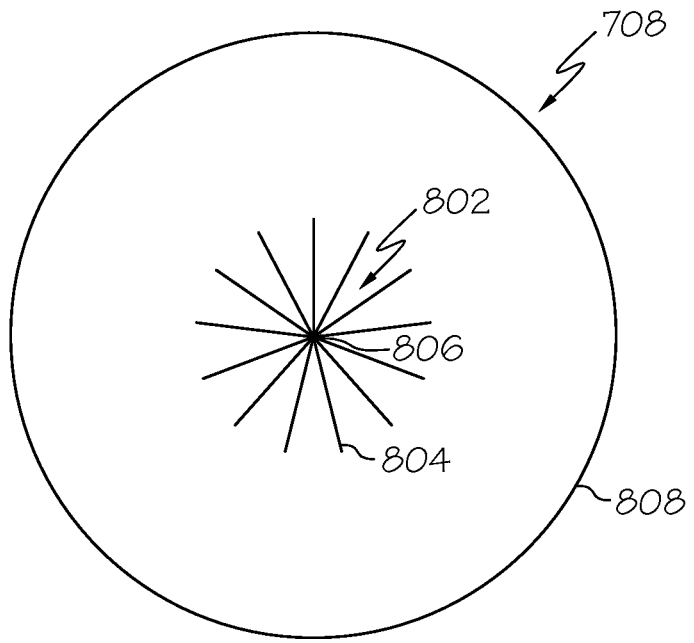
FIGS. 8 and 9 depict two embodiments of a foreign-object-damage shield that may be used in the actuator assembly depicted in FIGS. 2 and 3.
Figure 9:
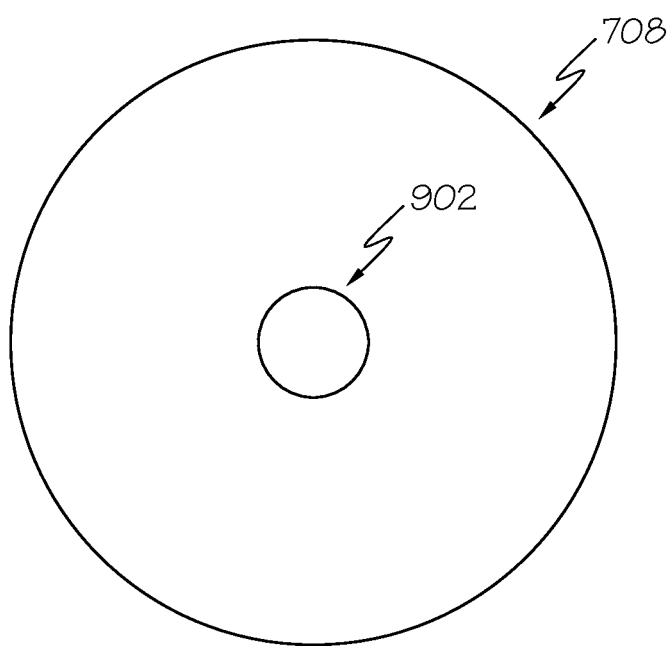

The FOD shield 708 is preferably comprised of a suitably flexible material, such as rubber or similar material, and will include a hole or other suitable opening through which the motor output shaft 702 may be inserted. Two, non-limiting, exemplary configurations of suitable openings are depicted in FIGS. 8 and 9. In the embodiment depicted in FIG. 8, the opening 802 is defined by a plurality of cuts 804 that extend radially from the center 806 of the FOD shield 708 toward its outer periphery 808. In the embodiment depicted in FIG. 9, the opening 902 has the same (or at least substantially the same) nominal diameter as the motor output shaft 702, and stretches to allow the motor output gear 456 to be pushed thru and then snap back to the diameter of the motor output shaft 702. It will be appreciated that in some embodiments the motor output shaft 702 and motor output gear 456 may be separated from each other without the motor output gear 456 falling out or otherwise being displaced during motor 206 removal.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention.

What is claimed is:

1. An aircraft electric brake actuator assembly, comprising:
   an actuator housing configured to be mounted on an aircraft landing gear, the actuator housing defining an actuator gearbox housing;
   a motor housing coupled to the actuator housing and removable therefrom, wherein the motor housing is accessible when the actuator housing is mounted on the aircraft landing gear;
   an actuator disposed within the actuator housing, the actuator being coupled to receive a drive torque and configured, upon receipt of the drive torque, to translate to a position;
   an electric motor disposed within the motor housing and removably coupled to the actuator, the electric motor adapted to be selectively energized and configured, upon being energized, to rotate and thereby supply the drive torque to the actuator, wherein the electric motor comprises an output shaft;
   a gear set disposed within the actuator gearbox housing and coupled between the actuatol and the output shaft;
   a support structure coupled to the actuator gearbox housing and disposed between the electric motor and the actuator gearbox housing; and
   a foreign-object-damage (FOD) shield disposed within the support structure, the FOD shield including an opening through which the output shaft extends,
   wherein the opening in the FOD shield is dimensioned to at least inhibit debris ingress into the gearbox housing when the electric motor is removed from the actuator assembly while the actuator housing is mounted on the aircraft landing gear, and
   wherein the FOD shield is configured such that the opening is substantially closed when the electric motor is removed from the actuator assembly.

2. The actuator assembly of claim 1, wherein:
   the output shaft has a nominal outer diameter; and
   the opening has nominal diameter that is at least substantially identical to the nominal outer diameter of the output shaft.

3. The actuator assembly of claim 1, wherein:
   the FOD shield has a center and an outer periphery; and
   the opening is defined by a plurality of cuts that extend radially from the center toward the outer periphery.

4. The actuator assembly of claim 1, further comprising:
   an actuator brake disposed within the motor housing and removably coupled to the motor, the actuator brake configured to selectively engage and disengage the motor to thereby at least inhibit motor rotation and allow motor rotation, respectively.

5. The aircraft electric brake actuator assembly of claim 1, wherein the gear set comprises a motor output gear configured to engage with the output shaft of the motor, wherein the motor output gear and output shaft are configured to be separated without the motor output gear being displaced during removal of the motor from the brake actuator assembly.

6. The aircraft electric brake actuator assembly of claim 1, further comprising a plurality of mounting bolts, wherein the actuator housing comprises a mounting flange, wherein the motor is removably coupled to the mounting flange via the plurality of mounting bolts.

7. The aircraft electric brake actuator assembly of claim 6, further comprising a seal disposed between the motor and the mounting flange, wherein the seal is thermally insulative.

8. The aircraft electric brake actuator assembly of claim 1, wherein the FOD shield is an integral part of the support structure.

9. The aircraft electric brake actuator assembly of claim 1, wherein the FOD shield is adhered to the support structure.

10. The aircraft electric brake actuator assembly of claim 1, wherein the support structure is coupled to the actuator gearbox housing.

11. The actuator assembly of claim 1, further comprising a motor output gear coupled to the output shaft of the electric motor, wherein the FOD shield is comprised of a flexible material that enables the opening of the FOD shield to stretch to receive the output shaft and the motor output gear coupled to the output shaft.

12. An aircraft electric brake actuator assembly, comprising:
    an actuator housing configured to be mounted on an aircraft landing gear, the actuator housing defining an actuator gearbox housing;
    an actuator disposed within the actuator housing, the actuator being coupled to receive a drive torque and configured, upon receipt of the drive torque, to translate to a position;
    a gear set disposed within the actuator gearbox housing and coupled to the actuator;
    an electric motor coupled to the actuator housing and including an output shaft coupled to the gear set, the electric motor being configured to at least selectively supply the drive torque to the actuator via the gear set;
    a foreign-object-damage (FOD) shield disposed between the electric motor and the actuator gearbox housing, the FOD shield including an opening through which the output shaft extends, wherein the opening in the FOD shield is dimensioned to at least inhibit debris ingress into the gearbox housing when the electric motor is removed from the actuator assembly while the actuator housing is mounted on the aircraft landing gear; and
    a FOD support structure coupled to the actuator gearbox housing and housing the FOD shield,
    wherein the FOD shield is configured such that the opening is substantially closed when the electric motor is removed from the actuator assembly.

13. The actuator assembly of claim 12, wherein:
    the output shaft has a nominal outer diameter; and
    the opening has nominal diameter that is at least substantially identical to the nominal outer diameter of the output shaft.

14. The actuator assembly of claim 12, wherein:
    the FOD shield has a center and an outer periphery; and
    the opening is defined by a plurality of cuts that extend radially from the center toward the outer periphery.

15. The aircraft electric brake actuator assembly of claim 12, wherein the gear set comprises a motor output gear configured to engage with the output shaft of the motor, wherein the motor output gear and output shaft are configured to be separated without the motor output gear being displaced during removal of the motor from the brake actuator assembly.

16. The aircraft electric brake actuator assembly of claim 12, further comprising a plurality of mounting bolts, wherein the actuator housing comprises a mounting flange, wherein the motor is removably coupled to the mounting flange via the plurality of mounting bolts.

17. An aircraft electric brake actuator assembly, comprising:
- an actuator housing configured to be mounted on an aircraft landing gear, the actuator housing defining an actuator gearbox housing;
- a motor housing coupled to the actuator housing and removable therefrom, wherein the motor housing is accessible when the actuator housing is mounted on the aircraft landing gear;
- an actuator disposed within the actuator housing, the actuator being coupled to receive a drive torque and configured, upon receipt of the drive torque, to translate to a position;
- a gear set disposed within the actuator gearbox housing and coupled to the actuator, wherein the gear set comprises a motor output gear;
- an electric motor disposed within the motor housing and coupled to the actuator housing, the electric motor including an output shaft coupled to the gear set, the electric motor being configured to at least selectively supply the drive torque to the actuator via the gear set, wherein the output shaft is configured to engage with the motor output gear, and wherein the motor output gear and output shaft are configured to be separated without the motor output gear being displaced during removal of the motor from the brake actuator assembly;
- a foreign-object-damage (FOD) shield disposed between the electric motor and the actuator gearbox housing, the FOD shield including an opening through which the output shaft extends, wherein the opening in the FOD shield is dimensioned to at least inhibit debris ingress into the gearbox housing when the electric motor is removed; and
- an FOD support structure coupled to the actuator gearbox housing and supporting the FOD shield,
- wherein the FOD shield is configured such that the opening is substantially closed when the electric motor is removed from the actuator assembly.

18. The actuator assembly of claim 17, wherein:
the output shaft has a nominal outer diameter; and
the opening has nominal diameter that is at least substantially identical to the nominal outer diameter of the output shaft.

19. The actuator assembly of claim 17, wherein:
the FOD shield has a center and an outer periphery; and
the opening is defined by a plurality of cuts that extend radially from the center toward the outer periphery.

20. The actuator assembly of claim 17, further comprising:
an actuator brake disposed within the motor housing and removably coupled to the motor, the actuator brake configured to selectively engage and disengage the motor to thereby at least inhibit motor rotation and allow motor rotation, respectively.

* * * * *